United States Patent
McDonald et al.

(10) Patent No.: US 9,831,016 B2
(45) Date of Patent: Nov. 28, 2017

(54) STRIPPING STRUCTURE AND METHOD FOR REMOVING ENAMEL INSULATION FROM LEAD ENDS

(71) Applicant: ABB Technology Ltd., Zurich (CH)

(72) Inventors: Thomas H. McDonald, St. Louis, MO (US); Rodney Lee Woll, Edwardsville, IL (US); William Eakins, Bloomfield, CT (US); Thomas Fuhlbrigge, Ellington, CT (US); Harald Staab, Bavaria (DE); Jeremy Newkirk, West Hartford, CT (US); George Zhang, Windsor, CT (US)

(73) Assignee: ABB SCHWEIZ AG, Baden (CH)

( * ) Notice: Subject to any disclaimer, the term of this patent is extended or adjusted under 35 U.S.C. 154(b) by 913 days.

(21) Appl. No.: 13/688,263

(22) Filed: Nov. 29, 2012

(65) Prior Publication Data
US 2014/0144871 A1    May 29, 2014

(51) Int. Cl.
*H01B 13/00* (2006.01)
*H02G 1/00* (2006.01)
*H02G 1/12* (2006.01)

(52) U.S. Cl.
CPC .......... *H01B 13/00* (2013.01); *H02G 1/1287* (2013.01); *H02G 1/005* (2013.01); *H02G 1/12* (2013.01); *H02G 1/1297* (2013.01)

(58) Field of Classification Search
USPC .............. 156/345.2, 345.11, 345.21, 345.18, 156/345.15; 216/13
See application file for complete search history.

(56) References Cited

U.S. PATENT DOCUMENTS

| 6,221,167 B1 * | 4/2001 | Karasawa | B08B 3/10 134/1 |
| 2002/0132480 A1 * | 9/2002 | Shindo | H01L 21/6708 438/689 |
| 2004/0011463 A1 * | 1/2004 | Nakagawa | H01L 21/67207 156/345.18 |
| 2005/0194356 A1 * | 9/2005 | Bergman | B08B 3/00 216/83 |

(Continued)

FOREIGN PATENT DOCUMENTS

| JP | 05199631 A | * | 8/1993 |
| JP | 10210621 A | * | 8/1998 |

(Continued)

OTHER PUBLICATIONS

Machine Generated English Translation of JP 10210621. Published Aug. 1998.*

(Continued)

*Primary Examiner* — Sylvia R MacArthur
(74) *Attorney, Agent, or Firm* — Manelli Selter PLLC; Edward J. Stemberger

(57) ABSTRACT

Stripping structure strips insulation from ends of a plurality of leads of a lead bundle. Each lead includes a conductor member coated with the insulation. The structure includes a housing having wall structure defining a stripping chamber, an inlet in fluid communication with the stripping chamber, and an outlet in fluid communication with the stripping chamber. A cover has an opening for receiving an end of the lead bundle in a sealing manner so that the leads thereof are received in the stripping chamber. Chemical stripping solution is in communication with the inlet. When the lead bundle is received through the opening with the leads in the stripping chamber and when the chemical stripping solution is provided though inlet and in the stripping chamber, the chemical stripping solution strips the insulation from the conductor members, with the stripping solution along with stripped insulation exiting through the outlet.

19 Claims, 1 Drawing Sheet

(56) References Cited

U.S. PATENT DOCUMENTS

| | | | |
|---|---|---|---|
| 2006/0118406 A1* | 6/2006 | Delahoy | C23C 14/086 204/192.12 |
| 2006/0281326 A1* | 12/2006 | Ose | H01L 21/67051 438/745 |
| 2009/0078582 A1* | 3/2009 | Kobayashi | H01L 21/67051 205/554 |
| 2011/0232843 A1* | 9/2011 | Bowman | F16J 15/062 156/345.1 |
| 2012/0067847 A1* | 3/2012 | Sakurai | H01L 21/31111 216/83 |
| 2013/0260569 A1* | 10/2013 | Ganster | H01L 21/67051 438/745 |
| 2014/0144871 A1* | 5/2014 | McDonald | H01B 13/00 216/13 |

FOREIGN PATENT DOCUMENTS

| | | | | |
|---|---|---|---|---|
| JP | 6471009 A | * | 2/2003 | |
| JP | WO 2012015062 A1 | * | 2/2012 | H01R 43/28 |
| KR | 20110040092 A | * | 4/2011 | |

OTHER PUBLICATIONS

Machine Generated English Translation of JP 05199631. Published Aug. 1993.*

Machine Generated English Translation of KR20110040092. Published Apr. 2011.*

Machine Generated English Translation JP2003-45256A published Feb. 14, 2003.*

Machine Generated English Translation JP10210621A. Published Aug. 1998.*

Machine Generated English Translation JP05199631A published Aug. 1993.*

Machine Generated English Translation of JP 05-199631. Published Aug. 6, 1993.*

Machine Generated English Translation of JP 10-210621. Published Aug. 7, 1998.*

* cited by examiner

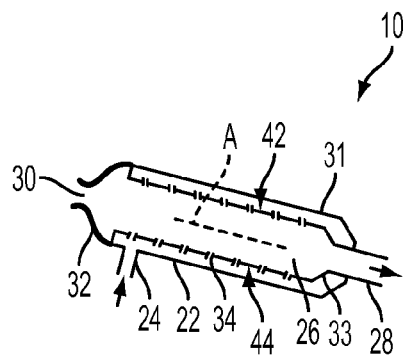
FIG. 1
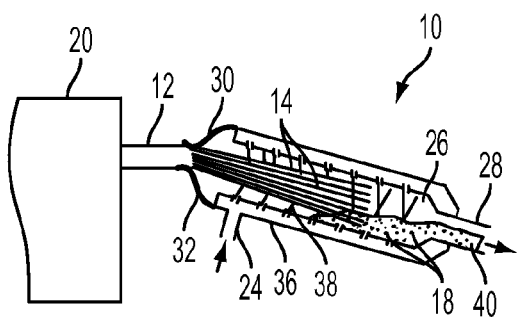
FIG. 2
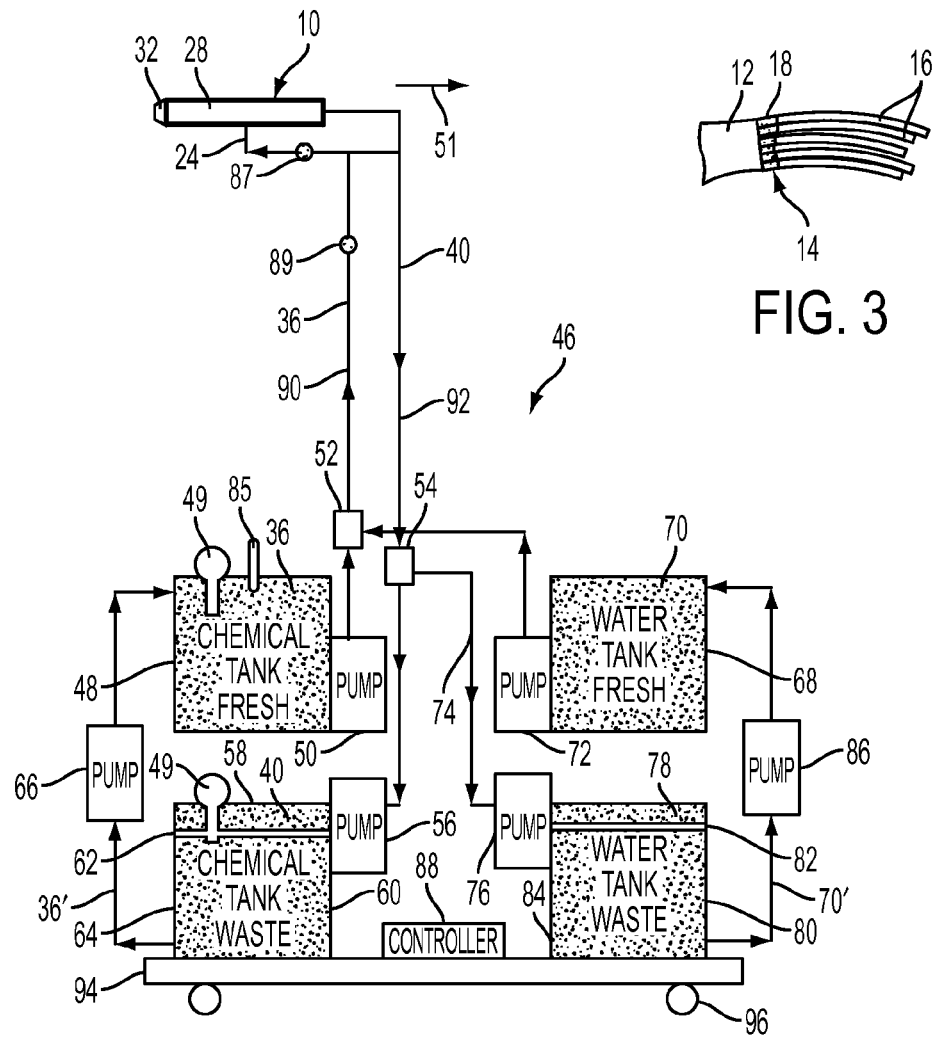
FIG. 3
FIG. 4

STRIPPING STRUCTURE AND METHOD FOR REMOVING ENAMEL INSULATION FROM LEAD ENDS

FIELD

The invention relates to electrical winding leads and, more particularly, to a method and structure for removing enamel insulation from ends of winding leads by using a chemical solution.

BACKGROUND

Winding operations for transformers, motors or generators require removal of enamel coating or insulation from the windings leads of a lead bundle for making electrical connections. The conventional manual process includes heating the end of the individual winding leads of a lead bundle with a torch to burn off enamel insulation, placing the winding leads into an alcohol solution, scrubbing each individual winding lead with a scour pad or the like to clean the lead, and returning the lead bundle to its original position. This process is labor intensive, not safe due to burning, and is time consuming.

Thus, there is a need to provide a structure and a method for chemically removing enamel from winding leads that is less time consuming, less labor intensive and is environmentally compliant.

SUMMARY

An objective of the invention is to fulfill the need referred to above. In accordance with the principles of the present invention, this objective is obtained by providing stripping structure for stripping ends of a plurality of leads of a lead bundle. Each lead includes a conductor member coated with insulation. The structure includes a housing having wall structure defining a stripping chamber, an inlet in fluid communication with the stripping chamber, and an outlet in fluid communication with the stripping chamber. A cover is coupled to the housing and has an opening constructed and arranged to receive an end of the lead bundle so that the leads thereof are received in the stripping chamber. Chemical stripping solution is in communication with the inlet and thus with the stripping chamber. When the lead bundle is received through the opening with the leads in the stripping chamber and when the chemical stripping solution is provided though inlet and in the stripping chamber, the chemical stripping solution strips the insulation from the conductor members, with the stripping solution along with stripped insulation exiting through the outlet.

In accordance with another aspect of an embodiment, a system is provided for stripping ends of a plurality of leads of a lead bundle. Each lead includes a conductor member coated with insulation. The stripping structure includes a housing having wall structure defining a stripping chamber, an inlet in fluid communication with the stripping chamber, and an outlet in fluid communication with the stripping chamber. A cover is coupled to the housing and has an opening constructed and arranged to receive an end of the lead bundle so that the leads thereof are received in the stripping chamber. A first tank contains clean chemical stripping solution. A first pump is associated with the first tank for pumping the clean chemical stripping solution to the inlet of the housing an thus to the stripping chamber. A second tank is fluidly coupled with the outlet of the housing for receiving waste solution including insulation stripped from the conductor members along with waste chemical stripping solution. A third tank contains clean water. A second pump is associated with the third tank for pumping the clean water into the inlet of the housing, after stripping the insulation from the conductor members, to rinse the conductor members. A fourth tank is fluidly coupled with the outlet of the housing for receiving waste water.

In accordance with yet another aspect of an embodiment, a method is provided for stripping ends of a plurality of leads of a lead bundle. Each lead includes a conductor member coated with insulation. The method provides a stripping structure having wall structure defining a stripping chamber, an inlet in fluid communication with the stripping chamber, and an outlet in fluid communication with the stripping chamber. The plurality of leads is placed in the stripping chamber. Chemical stripping solution is supplied to the inlet and into the stripping chamber to chemically strip the insulation from the conductor members. Waste solution is permitted to drain from the outlet.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 1 is a schematic illustration of stripping structure provided in accordance with an embodiment.

FIG. 2 is a view of the stripping structure of FIG. 2, shown removing an enamel coating from winding leads.

FIG. 3 is a partial view of a lead bundle shown with enamel stripped from copper conductor members at an end thereof.

FIG. 4 shows a system employing the stripping structure of FIG. 1.

DETAILED DESCRIPTION OF EXEMPLARY EMBODIMENTS

With reference to FIGS. 1 and 2, stripping structure for stripping electrical insulation or coating from winding leads of a lead bundle is shown, generally indicated at 10, in accordance with an embodiment. As shown in FIG. 3, the lead bundle 12 is preferably a singular member comprised of a plurality of individual winding leads, generally indicated at 14. The winding leads 14 are preferably copper conductor members 16 coated with enamel 18 that are as used for large size transformers 20 (FIG. 2), motors, or generators.

Returning to FIG. 1, the stripping structure 10 includes an elongated housing 22 having an inlet 24 for receiving a supply of chemical stripping solution, a stripping chamber 26 in fluid communication with inlet 24, a drain or outlet 28 in fluid communication with the stripping chamber 26 permitting stripping solution to exit the structure 10, an opening 30 in plug or end cover 32 where the end portion of a lead bundle 12 is inserted so as to enter the stripping chamber 26. In the embodiment, the housing 12 includes an outer wall structure 31 and an inner wall structure 33, with the inner wall structure 33 defining the stripping chamber 26.

The end cover 32 is coupled to the housing and is preferably made of rubber so as to be flexible. The cover 32 provides a seal between the stripping chamber 26 and the lead bundle 12 that prevents liquid from pouring out of the opening 30. The stripping structure 10 also includes a plurality of nozzles 34 for directing stripping solution into the stripping chamber 26. The nozzles 34 can have different opening sizes and are preferably replaceable.

With reference to FIG. 3, the winding leads 14 of the lead bundle 12 are provided in the stripping chamber 26. The leads 14 may need to be separated to allow a chemical stripping solution 36 to flow between leads 14. The leads 14 have a tendency to stick together due to the enamel, so if they are not separated the enamel may not be removed between the leads. The flexible end cover 32 is tightened by a clamp or the like around the lead bundle 12. A chemical stripping solution 36 is pumped into the chamber 26 with positive pressure. The stripping solution is preferably Aquastrip ACB manufactured by Hubbard-Hall, or any other chemical solution or fluid suitable for stripping enamel or similar insulation coating from wire in compliance with EPA and OSHA requirements. The nozzles 34 create a shower jet 38 or bath onto the winding leads 14 with the agitation of the shower or bath washing away dissolving pieces of the enamel insulation 18. Clean stripping solution 36 is provided to the chamber 26 causing the draining waste solution 40 to rinse away by gravity or by sucking that is created at drain 28. The inner wall structure 33 separates the clean solution 36 from the waste solution 40. In the embodiment, the drain 28 is located at a level below the opening 30 to facilitate draining. Once the enamel coating 18 is removed, the lead bundle 12 is removed from the stripping structure 10, resulting in the conductor members 16 being free from the enamel coating 18 at the ends thereof, as shown in FIG. 3. The stripping structure 10 is preferably made from stainless steel to protect it from the chemical solution 36.

As shown in FIG. 1, the nozzles 34 are preferably distributed evenly on the inner wall 33 and are tilted away from the opening 30. A first set 42 of nozzles 34 is disposed on one side of a center axis A of the chamber 26 and a second set 44 of nozzles 34 is disposed on an opposite side of the center axis A. The nozzles 34 radially point towards the center axis A of the chamber 26 such that shower jets 38 of the solution 26 cross the center axis A. Alternatively, the nozzles 34 can radially point in different directions such that the shower jets 38 create a high agitation and swirl of the stripping solution 36. In yet another embodiment, the inner wall structure 33 and nozzles 34 can be omitted, providing a bath instead of shower jet of the stripping solution 36 in the stripping chamber 26.

FIG. 4 shows a stripping system, generally indicated at 46, that employs the stripping structure 10 of FIG. 1. The system 46 includes a tank 48 containing fresh or clean chemical stripping solution 36. An immersion heater 49 is preferably provided in the tank 48 to heat the solution 36. The heater 49 is temperature controlled. A pump 50 pumps the clean solution 36 through a manifold valve 52 to the inlet 24 of the stripping structure 10. A vacuum 51, preferably provided by pump 56 can maintain clean solution 36 in the nozzles 34. The draining waste solution 40 (stripped insulation 18 and waste stripping solution 36) is sent through manifold valve 54 and pump 56 to a top portion 58 of another tank 60. A filter 62 separates the top portion 58 of tank 60 from a bottom portion 64 thereof so as to filter the enamel coating 18 particles from the waste solution 40 with filtered recycled solution 36' in tank portion 64 being directed to tank 48 via a pump 66. The filter 62 is preferably a removable stainless steel mesh.

The system 46 also includes a tank 68 containing fresh water 70 for rinsing remaining waste solution 40 from the conductor members 16. A pump 72 pumps the water 70 through the valve 52 to the inlet 24 of the stripping structure 10. The draining waste water 74 is sent through valve 54 and pump 76 to a top portion 78 of another tank 80. A filter 82 separates the top portion 78 of tank 80 from a bottom portion 84 thereof so as to filter the waste water 74, with filtered recycled water 70' in tank portion 84 being directed to tank 68 via a pump 86. The filter 82 is preferably a removable stainless steel mesh.

A controller 88 is associated with and controls the operation of the pumps and valves in an automatic, closed-loop manner. At least one thermistor 85 determining temperature of the stripping solution 36, at least one flow meter 87 determining the supply flow rate of the stripping solution 36, and/or at least on pressure sensor 89 determining the supply pressure of the stripping solution 36 can be provided. Signals from these devices alone, or in combination, can be sent to the controller 88 to control the operation of the pump 50.

The stripping structure 10 can be supported with a frame structure (not shown) or with an adjustable but self-supporting supply hose 90 or drain hose 92, or by both of these hoses 90, 92. The system 46 preferably includes a base 94 that can be moved and lifted by a forklift or can include rollers, casters or wheels 96 that are passive or driven.

Thus, the structure 10 of system 46 and the method described removes enamel or coating from winding lead ends in a less time consuming and labor intensive manner, is environmentally compliant, is repeatable and can be performed with limited operator intervention.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. Stripping structure for stripping ends of a plurality of leads of a lead bundle, each lead including a conductor member coated with insulation, the structure comprising:
   a housing having wall structure defining a stripping chamber, an inlet in fluid communication with the stripping chamber, and an outlet in fluid communication with the stripping chamber, the housing have an open end near the inlet,
   a cover coupled to the open end of the housing so as to substantially close the open end, the cover defining an interior space in communication with the stripping chamber, the cover having an opening constructed and arranged to receive an end of the lead bundle, at least a portion of the opening positioned upstream of the stripping chamber so that the leads thereof are received through the opening and into the stripping chamber, and
   chemical stripping solution in communication with the inlet and thus with the stripping chamber,
   wherein, when the lead bundle is received through the opening with the leads in the stripping chamber and when the chemical stripping solution is provided though inlet and in the stripping chamber, the chemical stripping solution strips the insulation from the conductor members, with the stripping solution along with stripped insulation exiting through the outlet, and wherein the cover is made entirely of flexible material and is constructed and arranged to seal about the lead bundle when it is received through the opening, to prevent the stripping solution from exiting the opening.

2. The structure of claim 1, in combination with the lead bundle having the plurality of leads, the lead bundle being received through the opening with the leads being disposed in the stripping chamber, and former wherein the cover is an end cover, at least a portion of the end cover being positioned outside of the housing.

3. The structure of claim 2, further comprising a plurality of nozzles in the housing constructed and arranged to receive the chemical stripping solution and direct the solution into the stripping chamber.

4. The structure of claim 3, wherein the housing has an inner wall structure defining the stripping chamber and outer wall structure, the nozzles being provided on the inner wall structure.

5. The structure of claim 3, wherein the stripping chamber has a center axis, the nozzles being constructed and arranged to produce shower jets of the solution that cross the center axis.

6. The structure of claim 5, wherein a first set of nozzles is disposed on one side of the center axis a second set of nozzles is disposed on an opposite side of the center axis.

7. The structure of claim 5, wherein the nozzles are distributed evenly on the inner wall structure and are tilted away from the opening.

8. The structure of claim 1, wherein the insulation is enamel and the chemical stripping solution comprises an enamel remover, and further including a clamp configured to tighten the cover to the housing.

9. The structure of claim 1, wherein the cover is made entirely of rubber.

10. A system for stripping ends of a plurality of leads of a lead bundle, each lead including a conductor member coated with insulation, the system comprising:
   stripping structure comprising:
      a housing having wall structure defining a stripping chamber, an inlet in fluid communication with the stripping chamber, and an outlet in fluid communication with the stripping chamber, the housing have an open end near the inlet, and
      an end cover, made entirely of flexible material, coupled to the open end of the housing so as to substantially close the open end, the cover defining an interior space in communication with the stripping chamber, the cover having an opening constructed and arranged to receive an end of the lead bundle so that the leads thereof are received in the stripping chamber, the flexible end cover being constructed and arranged to provide a seal about the lead bundle, at least a portion of the seal positioned outside of the stripping chamber, and
   a first tank containing clean chemical stripping solution,
   a first pump associated with the first tank for pumping the clean chemical stripping solution to the inlet of the housing and thus to the stripping chamber,
   a second tank fluidly coupled with the outlet of the housing for receiving waste solution including insulation stripped from the conductor members along with waste chemical stripping solution,
   a third tank containing clean water,
   a second pump associated with the third tank for pumping the clean water into the inlet of the housing, after stripping the insulation from the conductor members, to rinse the conductor members, and
   a fourth tank fluidly coupled with the outlet of the housing for receiving waste water.

11. The system of claim 10, wherein the insulation is enamel and the chemical stripping solution comprises an enamel remover.

12. The system of claim 11, further comprising a plurality of nozzles in the housing constructed and arranged to receive the chemical stripping solution and direct the solution into the stripping chamber.

13. The system of claim 12, wherein the stripping chamber has a center axis, the nozzles being constructed and arranged to produce shower jets of the solution that cross the center axis.

14. The system of claim 12, further comprising a third pump associated with the second tanks and constructed and arranged to create a vacuum to maintain clean solution in the nozzles.

15. The system of claim 10, wherein the second tank has a filter for filtering the waste solution to produce recycled chemical solution, with the recycled chemical solution being directed to the first tank, and wherein the fourth tank has a filter for filtering the waste water to produce recycled water, with the recycled water being directed to the third tank.

16. The system of claim 10, further comprising a heater for heating the clean chemical stripping solution in the first tank, and further including a clamp configured to tighten the end cover to the housing.

17. The system of claim 10, further comprising a controller, associated with the pumps, to control operation of the pumps so that the system operates in an automatic closed-loop manner.

18. The system of claim 17, further comprising a temperature measuring device, a pressure measuring device, and a flow measuring device, each associated with the controller, for respectively measuring temperature, pressure, and flow rate of the clean chemical stripping solution that is pumped to the inlet.

19. The system of claim 10, wherein the end cover is made entirely of rubber.

* * * * *